US012799329B2

(12) United States Patent
Schöley et al.

(10) Patent No.: US 12,799,329 B2
(45) Date of Patent: Nov. 17, 2026

(54) CROSS-LINKABLE MASSES BASED ON ORGANOSILICON COMPOUNDS

(71) Applicant: WACKER CHEMIE AG, Munich (DE)

(72) Inventors: Peter Schöley, Diera-Zehren (DE); Uwe Scheim, Coswig (DE)

(73) Assignee: Wacker Chemie AG, Munich (DE)

( * ) Notice: Subject to any disclaimer, the term of this patent is extended or adjusted under 35 U.S.C. 154(b) by 517 days.

(21) Appl. No.: 17/926,144

(22) PCT Filed: May 27, 2020

(86) PCT No.: PCT/EP2020/064723

§ 371 (c)(1),
(2) Date: Nov. 18, 2022

(87) PCT Pub. No.: WO2021/239222

PCT Pub. Date: Dec. 2, 2021

(65) Prior Publication Data

US 2023/0183427 A1 Jun. 15, 2023

(51) Int. Cl.

| | |
|---|---|
| ***C08L 83/04*** | (2006.01) |
| ***C08G 77/18*** | (2006.01) |
| ***C08G 77/26*** | (2006.01) |
| ***C08G 77/38*** | (2006.01) |
| ***C08K 5/05*** | (2006.01) |
| ***C08K 5/544*** | (2006.01) |
| *C08G 77/14* | (2006.01) |
| *C08G 77/16* | (2006.01) |

(52) U.S. Cl.

CPC .............. *C08L 83/04* (2013.01); *C08G 77/18* (2013.01); *C08G 77/26* (2013.01); *C08G 77/38* (2013.01); *C08K 5/05* (2013.01); *C08K 5/544* (2013.01); *C08K 5/5477* (2021.01); *C08G 77/14* (2013.01); *C08G 77/16* (2013.01)

(58) Field of Classification Search

CPC ........................................................ C08K 5/05

See application file for complete search history.

(56) References Cited

U.S. PATENT DOCUMENTS

| | | | | |
|---|---|---|---|---|
| 9,249,301 | B2 * | 2/2016 | Schoeley | C08K 5/357 |
| 9,637,600 | B2 * | 5/2017 | Scheim | C08G 77/26 |
| 2015/0141686 | A1 * | 5/2015 | Larson | C08G 77/26 556/413 |

FOREIGN PATENT DOCUMENTS

| | | | |
|---|---|---|---|
| CN | 101541863 | A | 9/2009 |
| CN | 104334644 | A | 2/2015 |
| CN | 105348808 | A * | 2/2016 |
| DE | 102007037196 | A1 | 9/2008 |
| EP | 1964872 | A1 | 12/1999 |
| EP | 1431330 | B1 | 11/2005 |
| EP | 2176351 | B1 | 9/2013 |
| EP | 2789656 | A1 | 10/2014 |
| JP | H07157490 | A | 6/1995 |
| JP | H09111187 | A | 4/1997 |
| JP | H10279805 | A | 10/1998 |
| JP | 2000129199 | A | 5/2000 |

OTHER PUBLICATIONS

Machine translation of CN 155348808 (no date).*

* cited by examiner

*Primary Examiner* — Marc S Zimmer

(57) ABSTRACT

Crosslinkable compositions, processes for producing the same and products made therefrom. Where the crosslinkable compositions include a component (A) organosilicon compounds having at least two silanol groups and having a viscosity of $10^3$ to $10^6$ mPas at 25° C., mixtures (M) containing a component (B) of organosilicon compounds of the formula (I) and/or partial hydrolyzates thereof $$R^6R^7N—CR^1_2SiR_a(OR^2)_{3-a} \quad \text{(I)},$$

a component (C), selected from (C2) compounds of the formula (III)

$$R^5OH \quad \text{(III)}.$$

The crosslinkable compositions may optionally also include a catalyst (D).

20 Claims, No Drawings

CROSS-LINKABLE MASSES BASED ON ORGANOSILICON COMPOUNDS

CROSS-REFERENCE TO RELATED APPLICATIONS

This application is a U.S. National Phase application of PCT Application NO. PCT/EP2020/064723 filed on May 27, 2020, which is incorporated by reference herein in its entirety.

The invention relates to compositions crosslinkable by condensation reaction and based on organosilicon compounds, to processes for producing said compositions and to the use of same, and also to a process for producing organyloxy group-comprising organosilicon compounds.

One-component sealing compounds, which are storable with the exclusion of water and cure to give elastomers on ingress of water at room temperature with the elimination of alcohols, are already known. These products are used in large amounts, for example in the construction industry. These mixtures are often based on organopolysiloxanes bearing reactive substituents such as OH groups or hydrolyzable groups, such as for example alkoxy groups. Furthermore, these sealing compounds may contain fillers, plasticizers, crosslinkers, catalysts and various additives.

In the case of compositions which cure by elimination of alcohol, an important step is what is known as the end-capping reaction. This term describes the reaction of terminal OH groups, in particular of linear organopolysiloxanes, with alkoxysilanes. Since it proceeds slowly, this reaction is typically effected in an upstream step prior to the production of the sealing compound. Various catalysts have been proposed for optimization of the reaction. For example, EP-B 1964872 describes the use of zinc chelates/the use of guanidines or lithium compounds.

Typically, however, such catalysts have to be removed from the reaction mixture or at least neutralized because of the reduction in the storage stability or because of their yellowing tendency. The disadvantage of this is that it requires an additional process step which is technically highly complex in particular due to the high polymer viscosities. EP-B 2176351 describes an alkoxy system in which the end-capping can be conducted without additional catalysts. The reactivity of the silane used, which has an alkyl group substituted in the alpha position, is sufficiently high as to complete the end-capping within a few minutes.

However, it has been found these reactions result in a very large rise in the mixture viscosity. This is undesirable because such high viscosities are highly complex to handle industrially. Moreover, it is disadvantageous that subsequent processing steps such as the conveying with pumps or the incorporation of fillers, lead to undesirably strong temperature increases. This would reduce the storage stability of the RTV1 sealing compound produced, possibly additionally result in necessary cooling processes, and also risk the safety of the production plants due to the typically low flashpoints of the various mixture constituents.

It was therefore an object to overcome the disadvantages of the prior art.

The invention provides compositions crosslinkable by condensation reaction, producible by mixing (A) organosilicon compounds having at least two silanol groups and having a viscosity of $10^3$ to $10^6$ mPas at 25° C., and (M) mixtures containing (B) organosilicon compounds of the formula $$R^6R^7N{-}CR^1_2SiR_a(OR^2)_{3-a} \quad (I),$$

in which

R denotes identical or different monovalent hydrocarbon radicals, $R^1$ denotes identical or different monovalent hydrocarbon radicals or a hydrogen atom, $R^2$ may be identical or different and denotes monovalent, optionally substituted hydrocarbon radicals, $R^6$ may be identical or different and denotes monovalent, optionally substituted hydrocarbon radicals or a hydrogen atom, $R^7$ may be identical or different and denotes monovalent, optionally substituted hydrocarbon radicals, where $R^6$ and $R^7$ can also form a ring which may optionally be interrupted by heteroatoms, and a is equal to 0 or 1, preferably 0, and/or the partial hydrolyzates thereof, component (C), selected from (C1) organosilicon compounds of the formula $$R^3_{4-b}Si(OR^4)_b \quad (II),$$

in which $R^3$ may be identical or different and denotes monovalent, SiC-bonded, optionally substituted hydrocarbon radicals which may be interrupted by oxygen atoms, excluding $R^6R^7N{-}CR^1_2{-}$ radicals, $R^4$ may be identical or different and denotes monovalent hydrocarbon radicals which may optionally be interrupted by oxygen atoms, and b is 2, 3 or 4, preferably 3 or 4, and (C2) compounds of the formula $$R^5OH \quad (III),$$

in which $R^5$ may be identical or different and denotes monovalent, optionally substituted hydrocarbon radicals, and optionally (D) catalyst.

The partial hydrolyzates of the compounds of formula (I) may be partial homohydrolyzates or also partial cohydrolyzates. If the component (B) used according to the invention is partial hydrolyzates of the compounds of the formula (I), preference is given to those having up to 10 silicon atoms.

Preferably, the radical R is optionally substituted, monovalent hydrocarbon radicals having 1 to 18 carbon atoms, particularly preferably alkyl radicals, the vinyl radical, the 3,3,3-trifluoroprop-1-yl radical or the phenyl radical, in particular the methyl radical.

Examples of radicals R are alkyl radicals such as the methyl, ethyl, n-propyl, isopropyl, 1-n-butyl, 2-n-butyl, isobutyl, tert-butyl, n-pentyl, isopentyl, neopentyl, tert-pentyl radical; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl and cycloheptyl radical and methylcyclohexyl radicals; alkenyl radicals such as the vinyl, 1-propenyl and 2-propenyl radical; aryl radicals such as the phenyl, naphthyl, anthryl and phenanthryl radical; alkaryl radicals such as o-, m-, p-tolyl radicals, xylyl radicals and ethylphenyl radicals; and aralkyl radicals such as the benzyl radical and the α- and □-phenylethyl radicals.

Examples of radicals $R^1$ are a hydrogen atom and the radicals specified for R.

The radical $R^1$ is preferably a hydrogen atom and hydrocarbon radicals having 1 to 20 carbon atoms, in particular a hydrogen atom.

Examples of radicals $R^2$, $R^4$ and $R^5$ are independently of one another the radicals specified for R.

The radicals $R^2$, $R^4$ and $R^5$ are preferably independently of one another alkyl radicals having 1 to 8 carbon atoms, particularly preferably the methyl, ethyl, n-propyl or isopropyl radical, in particular the methyl or ethyl radical, very particularly preferably the ethyl radical.

The radicals $R^2$, $R^4$ and $R^5$ in the mixture (M) used according to the invention preferably have the same definition.

Examples of radicals $R^6$ are a hydrogen atom and the radicals specified for R.

The radical $R^6$ is preferably a hydrogen atom or linear, branched or cyclic hydrocarbon radicals having 1 to 6 carbon atoms, in particular the methyl, ethyl, n-butyl, cyclohexyl or phenyl radical.

Examples of radicals $R^7$ are the radicals specified for R.

The radical $R^7$ is preferably a hydrogen atom or linear, branched or cyclic hydrocarbon radicals having 1 to 6 carbon atoms, particularly preferably a hydrogen atom, the methyl, ethyl or n-butyl radical.

Radicals $R^6$ and $R^7$ may, together with the nitrogen atom to which they are attached, form a ring which for example may result in 1,4-tetrahydrooxazine or piperazine structures.

Examples of compounds (B) used according to the invention are aminomethyltriethoxysilane, N-methylaminomethyltriethoxysilane, N-ethylaminomethyltriethoxysilane, N-n-propylaminomethyltriethoxysilane, N-n-butylaminomethyltriethoxysilane, N-cyclohexylaminomethyltriethoxysilane, N-phenylaminomethyltriethoxysilane, N,N-dimethylaminomethyltriethoxysilane, N,N-diethylaminomethyltriethoxysilane, N,N-di-n-propylaminomethyltriethoxysilane, N,N-di-n-butylaminomethyltriethoxysilane, aminomethyltrimethoxysilane, N-methylaminomethyltrimethoxysilane, N-ethylaminomethyltrimethoxysilane, N-n-propylaminomethyltrimethoxysilane, N-n-butylaminomethyltrimethoxysilane, N-cyclohexylaminomethyltrimethoxysilane, N-phenylaminomethyltrimethoxysilane, N,N-dimethylaminomethyltrimethoxysilane, N,N-diethylaminomethyltrimethoxysilane, N,N-di-n-propylaminomethyltrimethoxysilane, N,N-di-n-butylaminomethyltrimethoxysilane, 4-(triethoxysilylmethyl)tetrahydro-1,4-oxazine and 4-(trimethoxysilylmethyl)tetrahydro-1,4-oxazine, where N-cyclohexylaminomethyltriethoxysilane, N-phenylaminomethyltriethoxysilane, N,N-di-n-butylaminomethyltriethoxysilane, 4-(triethoxysilylmethyl)tetrahydro-1,4-oxazine or 4-(trimethoxysilylmethyl)tetrahydro-1,4-oxazine are preferred and N,N-di-n-butylaminomethyltriethoxysilane or 4-(triethoxysilylmethyl)tetrahydro-1,4-oxazine are particularly preferred.

The compounds (B) used according to the invention are commercial compounds or can be produced by standard chemical methods.

Examples of radicals $R^3$ are the radicals specified for R and also radicals substituted with amino groups, such as $H_2N(CH_2)_3$—, $H_2N(CH_2)_2NH(CH_2)_2$—, $H_2N(CH_2)_2NH(CH_2)_2NH(CH_2)_3$—, $H_3CNH(CH_2)_3$—, $C_2H_5NH(CH_2)_3$—, $H_2N(CH_2)_4$—, $H_2N(CH_2)_5$—, $H(NHCH_2CH_2)_3$—, cyclo-$C_6H_{11}NH(CH_2)_3$—, $(CH_3)_2N(CH_2)_3$— and $(C_2H_5)_2N(CH_2)_3$— radicals.

The radical $R^3$ is preferably the methyl, n-butyl, 2,2,4-trimethylpentyl, n-hexadecyl, vinyl or phenyl radical or $H_2N(CH_2)_3$—, $H_2N(CH_2)_2NH(CH_2)_2$— or cyclo-$C_6H_{11}NH(CH_2)_3$— radicals.

Examples of compounds (C1) optionally used according to the invention are methyltrimethoxysilane, ethyltrimethoxysilane, n-propyltrimethoxysilane, n-butyltrimethoxysilane, n-hexadecyltrimethoxysilane, vinyltrimethoxysilane, phenyltrimethoxysilane, methyltriethoxysilane, ethyltriethoxysilane, n-propyltriethoxysilane, n-butyltriethoxysilane, n-hexadecyltriethoxysilane, vinyltriethoxysilane, phenyltriethoxysilane, tetraethoxysilane, 3-aminopropyltrimethoxysilane, N-(2-aminoethyl)-3-aminopropyltrimethoxysilane, N-cyclohexyl-3-aminopropyltrimethoxysilane, 3-aminopropyltriethoxysilane and N-(2-aminoethyl)-3-aminopropyltriethoxysilane and N-cyclohexyl-3-aminopropyltriethoxysilane, where methyltrimethoxysilane, n-hexadecyltrimethoxysilane, vinyltrimethoxysilane, phenyltrimethoxysilane, methyltriethoxysilane, n-hexadecyltriethoxysilane, vinyltriethoxysilane, phenyltriethoxysilane, tetraethoxysilane, 3-aminopropyltrimethoxysilane, N-(2-aminoethyl)-3-aminopropyltrimethoxysilane, N-cyclohexyl-3-aminopropyltrimethoxysilane, 3-aminopropyltriethoxysilane, N-(2-aminoethyl)$_3$-am inopropyltriethoxysilane or N-cyclohexyl-3-aminopropyltriethoxysilane are preferred and methyltriethoxysilane, vinyltriethoxysilane, phenyltriethoxysilane, tetraethoxysilane, 3-aminopropyltriethoxysilane, N-(2-aminoethyl)-3-aminopropyltriethoxysilane or N-cyclohexyl-3-aminopropyltriethoxysilane are particularly preferred.

The compounds (C1) optionally used according to the invention are commercial compounds or can be produced by standard chemical methods.

Examples of compounds (C2) optionally used according to the invention are methanol, ethanol, n-propanol, isopropanol, n-butanol, isobutyl alcohol, sec-butyl alcohol, amyl alcohols, such as pentan-1-ol, pentan-2-ol, pentan-3-ol, tert-pentanol, 3-methylbutan-1-ol, 3-methylbutan-2-ol, 2,2-dimethyl-1-propanol, n-hexanol and n-octanol, methanol or ethanol being preferred and ethanol being particularly preferred.

The compounds (C2) used according to the invention are commercial compounds or can be produced by standard chemical methods.

The mixtures (M) used according to the invention contain component (C) in amounts of preferably 0.01 to 20 parts by weight, particularly preferably 0.05 to 5 parts by weight, in particular 0.1 to 1 part by weight, based in each case on 100 parts by weight of component (B).

The component (C) used according to the invention may be exclusively organosilicon compounds (C1) or exclusively compounds (C2) or mixtures of compounds (C1) and (C2).

If the component (C) used according to the invention is mixtures of compounds (C1) and (C2), these are used in a weight ratio of (C1) to (C2) of preferably 0.01:1 to 1000:1.

The component (C) used according to the invention preferably is exclusively organosilicon compounds (C1) or exclusively compounds (C2).

In a further preferred embodiment, the component (C) used according to the invention is mixtures of organosilicon compounds (C1) and compounds (C2) in a weight ratio of (C1) to (C2) of 100:1 to 1000:1.

The catalyst (D) optionally present in the mixtures (M) used according to the invention may be any known catalysts which have also been used to date in what are known as end-capping reactions.

Preferred examples of catalysts (D) are zinc acetylacetonate, lithium ethoxide, lithium methoxide, n-butyllithium, N,N-di-n-butylammonium formate, N,N-di-n-butylammonium acetate, N,N,N',N'-tetramethylguanidine or 1,5,7-triazabicyclo[4.4.0]dec-5-ene, particular preference being given to 1,5,7-triazabicyclo[4.4.0]dec-5-ene.

If the mixtures (M) used according to the invention contain catalyst (D), this involves amounts of by preference 0.001 to 1 part by weight, preferably 0.005 to 0.1 parts by weight, in each case based on 100 parts by weight of the mixture (M). The mixtures (M) preferably contain no catalysts (D).

The individual constituents of the mixture (M) used according to the invention may in each case be one kind of such a constituent or else a mixture of at least two different kinds of such constituents.

The mixtures (M) used according to the invention are preferably essentially composed of the components (B), (C) and optionally (D), and they particularly preferably are composed to an extent of at least 95% by weight of the components (B), (C) and optionally (D). In particular, the mixtures (M) used according to the invention do not contain any further constituents besides the components (B), (C) and optionally (D).

To prepare the mixtures (M) used according to the invention, all constituents can be mixed with one another in any sequence. This mixing preferably takes place at room temperature and pressure of the surrounding atmosphere, that is to say about 900 to 1100 hPa and with the greatest possible exclusion of water from the surrounding atmosphere.

The compositions according to the invention contain mixtures (M) in amounts of preferably 1 to 10 parts by weight, particularly preferably 1 to 5 parts by weight, in particular 1.5 to 3.5 parts by weight, based in each case on 100 parts by weight of component (A).

The organosilicon compounds (A) used according to the invention may be any organosilicon compounds having at least two OH groups, which have also been used to date in compositions crosslinkable by condensation reaction.

The organosilicon compounds (A) used according to the invention are preferably those containing units of the formula $$R^8_d(OH)_eSiO_{(4-d-e)/2} \quad \text{(IV),}$$

in which

R⁸ may be identical or different and denotes optionally substituted hydrocarbon radicals which may be interrupted by oxygen atoms, d is 0, 1, 2 or 3, preferably 2, and e is 1, 2 or 3, preferably 0 or 1, with the proviso that the sum of d+e is ≤3 and at least two OH radicals are present per molecule.

Examples of radical $R^8$ are the examples specified for the R radical.

The radical $R^8$ is preferably monovalent hydrocarbon radicals having 1 to 18 carbon atoms, which are optionally substituted with halogen atoms, amino groups, ether groups, ester groups, epoxy groups, mercapto groups, cyano groups or (poly)glycol radicals, the latter being formed from oxyethylene and/or oxypropylene units, particularly preferably is alkyl radicals having 1 to 12 carbon atoms, in particular is the methyl radical.

The organosilicon compounds (A) used according to the invention are particularly preferably essentially linear, OH-terminated organopolysiloxanes, in particular α,ω-dihydroxydialkylpolysiloxanes.

Preferred examples of organosilicon compounds (A) are $(HO)Me_2SiO[SiMe_2O]_{30\text{-}2000}SiMe_2(OH)$ with Me meaning methyl radical.

The organosilicon compounds (A) are commercial products or can be produced by standard methods in silicon chemistry.

Organosilicon compounds (A) used according to the invention have a viscosity of preferably 1000 to 500 000 mPas, particularly preferably 1000 to 350 000 mPas and in particular 5000 to 150 000 mPas at 25° C.

In the context of the present invention, the dynamic viscosity of the organosilicon compounds is preferably measured in accordance with DIN 53019. The procedure is preferably as follows: Unless otherwise stated, the viscosity is measured at 25° C. using a "Physica MCR 300" rotational rheometer from Anton Paar. In this case, a coaxial cylinder measuring system (CC 27) with an annular measuring gap of 1.13 mm is used for viscosities of from 1 to 200 mPa·s, and a cone-plate measuring system (Searle system with CP 50-1 measuring cone) is used for viscosities of greater than 200 mPa·s. The shear rate is adapted to the polymer viscosity (1 to 99 mPa·s at 100 $s^{-1}$, 100 to 999 mPa·s at 200 $s^{-1}$, 1000 to 2999 mPa·s at 120 $s^{-1}$, 3000 to 4999 mPa·s at 80 $s^{-1}$, 5000 to 9999 mPa·s at 62 $s^{-1}$, 10 000 to 12 499 mPa·s at 50 $s^{-1}$, 12 500 to 15 999 mPa·s at 38.5 $s^{-1}$, 16 000 to 19 999 mPa·s at 33 $s^{-1}$, 20 000 to 24 999 mPa·s at 25 $s^{-1}$, 25 000 to 29 999 mPa·s at 20 $s^{-1}$, 30 000 to 39 999 mPa·s at 17 $s^{-1}$, 40 000 to 59 999 mPa·s at 10 $s^{-1}$, 60 000 to 149 999 at 5 $s^{-1}$, 150 000 to 199 999 mPa·s at 3.3 $s^{-1}$, 200 000 to 299 999 mPa·s at 2.5 $s^{-1}$, 300 000 to 1 000 000 mPa·s at 1.5 $s^{-1}$.

Component (A) can be mixed with the mixture (M) at temperatures preferably of between 5° C. and 35° C. and at a pressure preferably of between 0.1 bar and 300 bar. If desired, however, this mixing may also be effected at higher temperatures, for example temperatures in the range from 35 to 135° C. If desired, heating or cooling may be carried out.

The mixing according to the invention of component (A) with mixture (M) preferably takes place with the greatest possible exclusion of water from the surrounding atmosphere. This can be done, for example, in systems having no dead space. If the mixing is effected, for example, in open, batchwise-operating mixers, the greatest possible exclusion of moisture should be ensured, for example by blanketing with dry air or dry nitrogen.

During the mixing of the organosilicon compounds (A) with the mixture (M), a reaction of the OH groups in compound (A) with silanes (B) takes place. This forms silyl groups having hydrolyzable groups on the polymer, meaning that crosslinked polymer structures can be formed on ingress of moisture. Under the above-described conditions in relation to temperature and pressure, the reaction times are preferably between 1 min and 30 min.

The mixing according to the invention can be effected with the aid of any desired mixing units, for example with static or dynamic mixers, with preference being given to dynamic mixers.

The mixing according to the invention is preferably conducted with continuously operating mixing units.

The invention provides a process for producing organyloxy group-comprising organosilicon compounds, characterized in that (A) organosilicon compounds having at least two silanol groups and having a viscosity of $10^3$ to $10^6$ mPas at 25° C. and (M) mixtures containing (B) organosilicon compounds of the formula (I) and/or the partial hydrolyzates thereof, component (C), selected from (C1) organosilicon compounds of the formula (II) and (C2) compounds of the formula (III), and optionally (D) catalyst are mixed with one another and allowed to react.

The process according to the invention for producing organyloxy group-comprising organosilicon compounds has the advantage that the viscosity of the reaction mixture surprisingly rises only very moderately after the reaction has concluded.

It was also surprising that no yellowing occurred despite the presence of compounds (B) comprising amino groups.

In addition to the organosilicon compounds (A) and the mixtures (M), it is now possible to use, for the production of the compositions according to the invention, all substances which have also been used to date in compositions crosslinkable by condensation reaction, such as for example crosslinking catalysts (E), fillers (F), adhesion promoters (G), plasticizers (H), crosslinkers (J) and additives (K).

Examples of crosslinking catalysts (E) are the titanium compounds already known to date, such as tetraisopropoxytitanate, and also zirconium and hafnium compounds, zinc compounds such as zinc (2-ethylhexoate) and organic tin compounds, such as di-n-butyltin dilaurate and di-n-butyltin diacetate, di-n-butyltin oxide, dioctyltin diacetate, dioctyltin dilaurate, dioctyltin oxide and also reaction products of these compounds with alkoxysilanes such as tetraethoxysilane, with preference being given to di-n-octyltin oxide in tetraethyl silicate hydrolyzate, di-n-octyltin oxide in a mixture of 50% by weight methyltriethoxysilane hydrolyzate and 50% by weight 3-aminopropyltriethoxysilane, di-n-octyltin oxide in tetraisopropyl silicate and the reaction product of din-butyltin diacetate and tetraethoxysilane.

If the compositions according to the invention contain crosslinking catalysts (E), this involves amounts of by preference 0.0001 to 2 parts by weight, preferably 0.001 to 1 part by weight, in each case based on 100 parts by weight of the composition according to the invention. The compositions according to the invention preferably contain catalyst (E).

Examples of fillers (F) are nonreinforcing fillers, i.e. fillers having a BET surface area of up to 50 $m^2/g$, such as quartz, diatomaceous earth, calcium silicate, zirconium silicate, zeolites, metal oxide powders such as oxides or mixed oxides of aluminum, titanium, iron or zinc, barium sulfate, calcium carbonate, gypsum, silicon nitride, silicon carbide, boron nitride, glass and plastic powder, such as polyacrylonitrile powder; reinforcing fillers, i.e. fillers having a BET surface area of more than 50 $m^2/g$, such as fumed silica, precipitated silica, precipitated calcium carbonate, carbon black such as furnace black and acetylene black, and silicon-aluminum mixed oxides of large BET surface area; fibrous fillers such as asbestos and plastic fibers. The fillers mentioned may be hydrophobicized, for example by treatment with organosilanes or organosiloxanes or by etherification of hydroxyl groups to alkoxy groups. If fillers (F) are used, they are preferably hydrophilic fumed silica, precipitated calcium carbonate and marble powder.

If the compositions according to the invention contain component (F), this involves amounts of by preference 1 to 80 parts by weight, preferably 5 to 65 parts by weight, in each case based on 100 parts by weight of composition according to the invention. The compositions according to the invention preferably contain component (F).

The adhesion promoter (G) optionally used in the compositions according to the invention may be silanes and organopolysiloxanes having functional groups, such as for example those having glycidoxypropyl, ureidopropyl or methacryloxypropyl radicals.

Examples of adhesion promoters (G) are epoxysilanes, such as glycidoxypropyltrimethoxysilanes, glycidoxypropylmethyldimethoxysilane, glycidoxypropyltriethoxysilane or glycidoxypropylmethyldiethoxysilane, tris[3-(trimethoxysilyl)propyl]isocyanurate, 2-(3-triethoxysilylpropyl)maleic anhydride, N-(3-trimethoxysilylpropyl)urea, N-(3-triethoxysilylpropyl)urea, N-(trimethoxysilylmethyl)urea, N-(methyldimethoxysilylmethyl)urea, N-(3-triethoxysilylmethyl)urea, N-(3-methyldiethoxysilylmethyl)urea, O-methylcarbamatomethylmethyldimethoxysilane, O-methylcarbamatomethyltrimethoxysilane, O-ethylcarbamatomethylmethyldiethoxysilane, O-ethylcarbamatomethyltriethoxysilane, 3-methacryloxypropyltrimethoxysilane, methacryloxymethyltrimethoxysilane, methacryloxymethylmethyldimethoxysilane, methacryloxymethyltriethoxysilane, methacryloxymethylmethyldiethoxysilane, 3-acryloxypropyltrimethoxysilane, acryloxymethyltrimethoxysilane, acryloxymethylmethyldimethoxysilanes, acryloxymethyltriethoxysilane, acryloxymethylmethyldiethoxysilane and partial condensates thereof and also ethoxy-terminated 3-aminopropyl(methyl)silsesquioxane (CAS number 128446-60-6).

If the compositions according to the invention contain component (G), this involves amounts of by preference 0.01 to 10 parts by weight, preferably 0.1 to 2.5 parts by weight, in each case based on 100 parts by weight of the composition according to the invention. Except when using calcium carbonates as filler, the compositions according to the invention preferably contain no component (G). If the compositions according to the invention contain calcium carbonate as filler (F), preference is given to using component (G).

Examples of plasticizers (H) are room-temperature-liquid dimethylpolysiloxanes end-capped by trimethylsiloxy groups, in particular having viscosities at 25° C. in the range between 5 and 10 000 mPas, and high-boiling hydrocarbons, such as paraffin oils or mineral oils consisting of naphthenic and paraffinic units.

If the compositions according to the invention contain component (H), this involves amounts of by preference 1 to 50 parts by weight, preferably 10 to 35 parts by weight, in each case based on 100 parts by weight of the composition according to the invention. The compositions according to the invention preferably contain component (H).

The further crosslinkers (J) optionally used in the compositions according to the invention may be any crosslinkers known to date having at least three condensable radicals, such as for example silanes having three organyloxy groups that are different from component (B).

The further crosslinkers (J) optionally used in the compositions according to the invention are particularly preferably silane crosslinkers, such as tetramethoxysilane, tetraethoxysilane, tetrapropoxysilane, tetrabutoxysilane, methyltrimethoxysilane, methyltriethoxysilane, vinyltrimethoxysilane, vinyltriethoxysilane, phenyltrimethoxysilane, phenyltriethoxysilane, 1,2-bis(trimethoxysilyl)ethane, 1,2-bis(triethoxysilyl)ethane, methyltriacetoxysilane, ethyltriacetoxysilane, methyltris(methylethylketoximo)silane or vinyltris(methylethylketoximo)silane, and partial hydrolyzates thereof.

The further crosslinkers (J) optionally used in the compositions according to the invention are commercial products or can be produced by methods known in silicon chemistry.

If the compositions according to the invention contain further crosslinkers (J), this involves amounts of by preference 0.1 to 10 parts by weight, particularly preferably 0.2 to 5 parts by weight, very particularly preferably 0.5 to 3 parts by weight, in each case based on 100 parts by weight of the composition according to the invention. The compositions according to the invention preferably contain crosslinkers (J).

If the mixture (M) used according to the invention already contains, as component (C), silanes (C1) of the formula (II) with b equal to 3 or 4, the use of crosslinker (J) can be dispensed with or the amount used can be reduced.

Examples of additives (K) are pigments, dyes, odorants, oxidation inhibitors, agents for influencing the electrical properties, such as conductive carbon black, flame retardants, light stabilizers and agents for prolonging the skin formation time, such as silanes having an SiC-bonded mercaptoalkyl radical, cell-generating agents, for example azodicarbonamide, heat stabilizers and thixotropic agents, such as for example polyethers, biocides such as fungicides, bactericides, acaricides and modulus-regulating agents such as polydimethylsiloxanes having just one OH end group and also agents for improving the storage stability, such as alkylphosphonic acids or phosphoric esters.

If the compositions according to the invention contain component (K), this involves amounts of by preference 0.0001 to 10 parts by weight, preferably 0.001 to 10 parts by weight, in each case based on 100 parts by weight of the composition according to the invention. The compositions according to the invention preferably contain component (K).

The compositions according to the invention are preferably those producible using (A) organosilicon compounds,
(M) mixtures containing organosilicon compounds (B) and component (C) selected from organosilicon compounds (C1) and compounds (C2), and optionally catalyst (D),
optionally (E) crosslinking catalysts,
optionally (F) fillers,
optionally (G) adhesion promoters,
optionally (H) plasticizers,
optionally (J) crosslinkers and
optionally (K) additives.

The compositions according to the invention are particularly preferably those producible using (A) essentially linear, OH-terminated organopolysiloxanes,
(M) mixtures containing organosilicon compounds (B) and compounds (C2), and optionally catalyst (D),
(E) crosslinking catalysts,
optionally (F) fillers,
optionally (G) adhesion promoters,
optionally (H) plasticizers,
optionally (J) crosslinkers and
optionally (K) additives.

The compositions according to the invention are furthermore particularly preferably those producible using (A) essentially linear, OH-terminated organopolysiloxanes,
(M) mixtures containing organosilicon compounds (B) and compounds (C1), and optionally catalyst (D),
(E) crosslinking catalysts,
optionally (F) fillers,
optionally (G) adhesion promoters,
optionally (H) plasticizers,
optionally (J) crosslinkers and
optionally (K) additives.

Particular preference is given to producing the compositions according to the invention using no constituents beyond components (A) to (K).

The individual constituents of the compositions according to the invention may in each case be one kind of such a constituent or else a mixture of at least two different kinds of such constituents.

The present invention further provides a process for producing the compositions according to the invention, characterized in that In a First Step
organosilicon compounds (A) optionally in a mixture with plasticizer (H) and mixtures (M) are mixed with one another and allowed to react and In a Second Step
the composition obtained in the first step is mixed with at least one component selected from crosslinking catalysts (E), fillers (F), adhesion promoters (G), plasticizers (H), crosslinkers (J) and additives (K).

The constituents can be mixed in the second step of the process according to the invention at temperatures preferably of between 5° C. and 35° C. and at a pressure preferably of between 0.1 bar and 300 bar. If desired, however, this mixing may also be effected at higher temperatures, for example temperatures in the range from 35 to 135° C. If desired, heating or cooling may be carried out.

Plasticizer (H) may be mixed entirely or partially with the polymer (A) as early as in the first step. The further components (E) to (K) optionally used may be mixed in in any desired sequence in the second step of the process according to the invention.

For convenience of processing, further plasticizers (H), if not already fully mixed with the polymer (A) in the first step, adhesion promoters (G) and further silanes (J) are preferably first added, and then fillers (F) and lastly crosslinking catalyst (E) and further additives (K) are added.

The mixing according to the invention of the individual components preferably takes place with the greatest possible exclusion of water from the surrounding atmosphere, which can for example be realized by blanketing with dry air or dry nitrogen.

In addition, the point at which crosslinking catalyst (E) is added is generally unimportant. However, it is expedient to add the catalyst only at the end, since the mixture is then activated. In practice, those skilled in the art will wish to avoid excessively long mixing of sealing compounds that are already highly reactive, since the complete exclusion of moisture during the production of the mixture is difficult or at least uneconomical.

After all desired constituents have been mixed, the composition according to the invention is preferably degassed and filled into moisture-tight containers.

The production according to the invention of the crosslinkable compositions according to the invention may be conducted either batchwise or continuously, preference being given to the continuous mode of operation.

In the continuous mode of operation, organosilicon compound (A) is preferably first mixed with mixture (M) and the further components (E) to (K) are added after preferably at least 50%, particularly preferably at least 80%, of the OH groups of component (A) have reacted. Preferably, plasticizers (H), adhesion promoters (G) and further silanes (J) are first added, then fillers (F) are mixed in and lastly crosslinking catalyst (E) and further additives (K) are added.

The compositions according to the invention are preferably one-component compositions which are storable with the exclusion of water and cure on ingress of water and which are generally referred to in the art as RTV-1 compositions.

The usual water content of air is sufficient for the crosslinking of the compositions according to the invention. The compositions according to the invention are preferably crosslinked at room temperature. They may, if desired, also be crosslinked at temperatures higher or lower than room temperature, for example at −5° to 15° C. or at 30° to 50° C. and/or using concentrations of water exceeding the normal water content of the air.

The crosslinking is preferably conducted at a pressure of from 100 to 1100 hPa, in particular at the pressure of the surrounding atmosphere.

The present invention further provides moldings produced by crosslinking the compositions according to the invention.

The compositions according to the invention can be used for all purposes for which it is possible to use compositions which are storable with the exclusion of water and crosslink to give elastomers on ingress of water at room temperature.

The compositions according to the invention thus have excellent suitability, for example, as sealants for joints, including vertical joints, and similar cavities of, for example, 10 to 40 mm internal width, for example of buildings, land vehicles, watercraft and aircraft, or as adhesives or cementing compositions, for example in window construction or in the production of aquariums or glass cabinets and, for example, for production of protective coatings, including those for surfaces exposed to the constant action of fresh or sea water, or coatings which prevent sliding, or of elastomeric moldings and for the insulation of electrical or electronic devices.

The compositions according to the invention have the advantage that they are easy to produce and have a high storage stability over a long period of time.

The compositions according to the invention have the advantage that only small amounts of, if any, toxicologically dangerous cleavage products are produced.

The mixtures (M) according to the invention have the advantage that they can be further processed rapidly.

The mixtures (M) according to the invention have the advantage that organosilicon compound (B) does not generate any yellowing, in particular when it is present in the mixture with components (C1).

Furthermore, the compositions according to the invention have the advantage that they can be produced in a fully continuous manner.

In the examples described below, all viscosity data are based on a temperature of 25° C. Unless stated otherwise, the examples that follow are conducted at a pressure of the surrounding atmosphere, that is to say at around 1000 hPa, and at room temperature, that is to say at around 23° C., or at a temperature as results when combining the reactants at room temperature without supplemental heating or cooling, and at a relative humidity of about 50%. Due to the rapid mode of working in the laboratory, blanketing with dry air was omitted. In addition, unless otherwise stated, all reported parts and percentages relate to weight.

The viscosities hereinbelow were determined in accordance with DIN 53019 as described above.

The following components are used:

SB1: 4-(triethoxysilylmethyl)tetrahydro-1,4-oxazine

SB2: N-cyclohexylaminomethyltriethoxysilane

SB3: 4-(triisopropoxysilylmethyl)tetrahydro-1,4-oxazine

TES: tetraethoxysilane (commercially available under the name "TES 28" from Wacker Chemie AG, Munich, Germany)

VTMO: vinyltrimethoxysilane

GF93: 3-aminopropyltriethoxysilane

GF9: N-(2-aminoethyl)-3-aminopropyltriethoxysilane

EXAMPLE 1

A mixture of 490 g of an α,ω-dihydroxypolydimethylsiloxane having a viscosity of 80 000 mPa·s (commercially available under the name "Polymer FD 80" from Wacker Chemie AG, Munich, Germany) and 94 g of an α,ω-bis(trimethylsiloxy)polydimethylsiloxane having a viscosity of 1000 mPa·s (commercially available under the name "Weichmacher 1000" from Wacker Chemie AG, Munich, Germany) was mixed with a mixture of 16.5 g of 4-(triethoxysilylmethyl)tetrahydro-1,4-oxazine (SB1) and 0.3 g of methanol. The viscosity of the polymer mixture thus obtained was measured after 24 hours of storage at room temperature and was 67 800 mPas.

EXAMPLES 2 TO 16

The procedure described in example 1 was repeated, with the modification that the mixtures described in table 1 were used. The resulting viscosities are likewise given in table 1.

COMPARATIVE EXAMPLE 1

The procedure described in example 1 was repeated, with the modification that no methanol was used.

TABLE 1

| Example | Mixture | | | Viscosity |
|---|---|---|---|---|
| C1 | 16.8 g of SB1 | — | — | 107 000 mPas |
| 1 | 16.5 g of SB1 | — | 0.30 g of methanol | 67 800 mPas |
| 2 | 16.5 g of SB1 | — | 0.15 g of ethanol | 78 100 mPas |
| 3 | 16.5 g of SB1 | — | 0.30 g of ethanol | 78 000 mPas |
| 4 | 16.5 g of SB1 | — | 0.60 g of ethanol | 75 000 mPas |
| 5 | 16.5 g of SB1 | 0.15 g of TES | — | 78 500 mPas |
| 6 | 16.5 g of SB1 | 0.30 g of TES | — | 82 600 mPas |
| 7 | 16.5 g of SB1 | 0.60 g of TES | — | 82 300 mPas |
| 8 | 16.5 g of SB1 | 0.15 g of VTMO | — | 81 200 mPas |
| 9 | 16.5 g of SB1 | 0.30 g of VTMO | — | 82 600 mPas |
| 10 | 16.5 g of SB1 | 0.60 g of VTMO | — | 82 300 mPas |
| 11 | 16.5 g of SB1 | 0.15 g of GF9 | — | 88 800 mPas |
| 12 | 16.5 g of SB1 | 0.30 g of GF9 | — | 89 400 mPas |
| 13 | 16.5 g of SB1 | 0.60 g of GF9 | — | 91 100 mPas |
| 14 | 16.5 g of SB1 | 0.15 g of GF93 | — | 87 300 mPas |

TABLE 1-continued

| Example | Mixture | | | Viscosity |
|---|---|---|---|---|
| 15 | 16.5 g of SB1 | 0.30 g of GF93 | — | 88 700 mPas |
| 16 | 16.5 g of SB1 | 0.60 g of GF93 | — | 91 000 mPas |

EXAMPLES E18, E20 AND E21

The procedure described in example 1 was repeated, with the modification that the mixtures described in table 2 were used. The resulting viscosities are likewise given in table 2.

COMPARATIVE EXAMPLE 2

The procedure described in example 18 was repeated, with the modification that no VTMO was used.

COMPARATIVE EXAMPLE 3

The procedure described in example 20 was repeated, with the modification that no methanol was used.

TABLE 2

| Example | Mixture | | | Viscosity |
|---|---|---|---|---|
| C2 | 16.8 g of SB2 | — | — | gelled |
| 18 | 16.5 g of SB2 | 0.30 g of VTMO | — | 81 400 mPas |
| C3 | 16.8 g of SB3 | — | — | 98 300 mPas |
| 20 | 16.5 g of SB3 | — | 0.30 g of methanol | 78 800 mPas |
| 21 | 16.5 g of SB3 | — | 0.30 g of ethanol | 78 000 mPas |

EXAMPLE 22

A mixture of 490 g of an α,ω-dihydroxypolydimethylsiloxane having a viscosity of 80 000 mPa·s (commercially available under the name "Polymer FD 80" from Wacker Chemie AG, Munich, Germany) and 94 g of an α,ω-bis(trimethylsiloxy)polydimethylsiloxane having a viscosity of 1000 mPa·s (commercially available under the name "Weichmacher 1000" from Wacker Chemie AG, Munich, Germany) was mixed in a planetary mixer with a mixture of 16.5 g of 4-(triethoxysilylmethyl)tetrahydro-1,4-oxazine and 0.3 g of methanol. After stirring this mixture for 30 min, 1 g of a product J1, which was composed of 16.0 mol % of units of the formula $MeSi(OEt)_2O_{1/2}$, 46.4 mol % of units of the formula $MeSi(OEt)O_{2/2}$, 36.5 mol % of units of the formula $MeSiO_{3/2}$, 0.2 mol % of units of the formula $Me_2Si(OEt)O_{1/2}$ and 0.9 mol % of units of the formula $Me_2SiO_{2/2}$, 8 g of 3-aminopropyltriethoxysilane (commercially available under the name GENIOSIL® GF 93 from Wacker Chemie AG, Munich, Germany), 2 g of vinyltriethoxysilane (commercially available under the name GENIOSIL® GF 56 from Wacker Chemie AG, Munich, Germany) and 5 g of tetraethyl silicate (commercially available under the name "Silikat TES 28" from Wacker Chemie AG, Munich, Germany) were added and the mixture was mixed for a period of 5 minutes. 45 g of a fumed silica having a BET specific surface area of 150 $m^2/g$ (commercially available under the name HDK® V15 from Wacker Chemie AG, Munich, Germany) were then mixed in and the mixture was completely homogenized at a pressure of 50 hPa. Lastly, 1 g of a 1:1 solution of octylphosphonic acid in methyltrimethoxysilane and 2 g of a reaction product of dibutyltin diacetate and tetraethoxysilane (commercially available under the name "Katalysator 41" from Wacker Chemie AG, Munich, Germany) were added and the mixture was homogenized for a further 5 min at a pressure of approx. 50 hPa (absolute).

The RTV1 composition thus obtained was filled into commercially available moisture-tight polyethylene cartridges.

Product J1 was produced by hydrolysis and condensation of methyltriethoxysilane. At 25° C. it had a density of 1.09 $g/cm^3$ and a viscosity of 28.4 mPa·s.

2 mm-thick sheets of the sealing compound produced in example 22 were in each case spread onto a polyethylene film, and after a day of curing were detached from the film and suspended such that air could be admitted from all sides for a further 6 days, such that the samples were cured over a total of 7 days. The relative humidity was set here at 50%, with the temperature being controlled at 23° C. Test specimens of the form S2 according to DIN 53504-85 were then stamped out of these sheets and the modulus of each was determined.

To determine the hardness, 6 mm-thick specimens were produced, which were cured on PE films over 7 days at a relative humidity of 50% and at a temperature of 23° C. by reaction with the ambient atmospheric humidity.

The hardness of the sealing compound cured tack-free was 22 Shore A. The modulus (tensile stress value at 100% elongation) was determined to be 0.38 MPa. The sealing compound is thus of exceptional suitability for the sealing of building joints, for example.

The invention claimed is:

1. A composition comprising:

an end-capped organyloxy group-containing organosilicon compounds that is crosslinkable by condensation reaction;

wherein the end-capped organyloxy group containing organosilicon compounds is a reaction product of a component (A) organosilicon compounds having at least two silanol groups and having a viscosity of $10^3$ to $10^6$ mPas at 25° C.;

a mixture (M) containing a component (B) of organosilicon compounds of the formula (I) and/or partial hydrolyzates thereof $$R^6R^7N—CR^1_2SiR_a(OR^2)_{3-a} \quad (I),$$

wherein R denotes identical or different monovalent hydrocarbon radicals;

wherein $R^1$ denotes identical or different monovalent hydrocarbon radicals or a hydrogen atom;

wherein $R^2$ may be identical or different and denotes monovalent, optionally substituted hydrocarbon radicals;

where $R^6$ and $R^7$ form a 1,4-tetrahydrooxazine ring;

wherein a is equal to 0 or 1;

a component (C), selected from (C2) compounds of the formula (III)

$$R^5OH \quad (III),$$

wherein $R^5$ may be identical or different and denotes monovalent, optionally substituted hydrocarbon radicals;

wherein the mixture (M) contains the component (C) in amounts of 0.01 to 20 parts by weight, based on 100 parts by weight of component (B) and optionally a catalyst (D).

2. The compositions of claim 1, wherein the radicals $R^2$, and $R^5$ in the mixture (M) used have the same definition.

3. The composition of claim 1, wherein the compounds (B) are 4-(triethoxysilylmethyl)tetrahydro-1,4-oxazine or 4-(trimethoxysilylmethyl)tetrahydro-1,4-oxazine.

4. The composition of claim 1, further comprising optionally crosslinking catalysts (E), optionally fillers (F), optionally adhesion promoters (G), optionally plasticizers (H), optionally crosslinkers (J), and optionally additives (K).

5. The compositions of claim 1, wherein the component (B) is an α-aminosilane of the formula (I).

6. The compositions of claim 1, wherein the component (C) is a viscosity modifier.

7. The composition of claim 1, wherein the component (C) controls the reactivity of the component (B) without the need for the catalyst (D).

8. The composition of claim 1, wherein end-capping is achieved without the use of the catalyst (D).

9. The composition of claim 1, wherein the organosilicon compound (B) 4-(triethoxysilylmethyl)tetrahydro-1,4-oxazine.

10. The composition of claim 1, wherein the organosilicon compound (B) comprises a 4-(trialkoxysilylmethyl)tetrahydro-1,4-oxazine structure.

11. The composition of claim 1, wherein the organosilicon compound (B) is selected from 4-(triethoxysilylmethyl)tetrahydro-1,4-oxazine or 4-(triisopropoxysilylmethyl)tetrahydro-1,4-oxazine.

12. The composition of claim 1, wherein the compound (C) is methanol, ethanol, or a mixture thereof.

13. The composition of claim 1, wherein the compound (C) is ethanol.

14. A process for producing organyloxy group-comprising organosilicon compounds, comprising:

providing a component (A) of organosilicon compounds having at least two silanol groups and having a viscosity of $10^3$ to $10^6$ mPas at 25° C., mixture (M) containing a component (B) of organosilicon compounds of a formula (I) and/or the partial hydrolyzates thereof, a component (C) selected from compounds (C2) of a formula (III), and optionally a catalyst (D), wherein the formula (I) is $$R^6R^7N—CR^1_2SiR_a(OR^2)_{3-a} \quad (I),$$

wherein R denotes identical or different monovalent hydrocarbon radicals, wherein $R^1$ denotes identical or different monovalent hydrocarbon radicals or a hydrogen atom, wherein $R^2$ may be identical or different and denotes monovalent, optionally substituted hydrocarbon radicals, where $R^6$ and $R^7$ form a 1,4-tetrahydrooxazine ring, wherein a is equal to 0 or 1, and wherein the formula (III) is $$R^5OH \quad (III),$$

wherein $R^5$ may be identical or different and denotes monovalent, optionally substituted hydrocarbon radicals;

wherein the mixture (M) contains the component (C) in amounts of 0.01 to 20 parts by weight, based on 100 parts by weight of component (B); and mixing the components with one another and allowing them to react such that component (B) end-caps component (A).

15. The process of claim 14, wherein in a first step the organosilicon compounds of component (A), optionally in a mixture with a plasticizer (H), and the mixture (M) are mixed with one another and allowed to react; and wherein in a second step, the composition obtained in the first step is mixed with at least one component selected from crosslinking catalysts (E), fillers (F), adhesion promoters (G), plasticizers (H), crosslinkers (J) and additives (K).

16. The process of claim 15, further comprising:

crosslinking the compositions so as to produce a molding.

17. The process of claim 14, wherein the component (B) is an α-aminosilane of the formula (I).

18. The process of claim 14, wherein the component (C) is a viscosity modifier.

19. The process of claim 14, wherein the component (C) controls the reactivity of the component (B) without the need for the catalyst (D).

20. The process of claim 14, further comprising an end-capping step, wherein the end-capping step is achieved without the use of the catalyst (D).

* * * * *